June 12, 1945.  M. H. BLANK  2,377,851
APPARATUS FOR CONTROLLING FLUID VOLUME IN FLUID COUPLINGS
Filed Feb. 17, 1941  4 Sheets-Sheet 1

FIG. 1

INVENTOR
MERTON H. BLANK
BY
ATTORNEYS

June 12, 1945.  M. H. BLANK  2,377,851
APPARATUS FOR CONTROLLING FLUID VOLUME IN FLUID COUPLINGS
Filed Feb. 17, 1941  4 Sheets-Sheet 3

INVENTOR
MERTON H. BLANK
By
ATTORNEYS

Patented June 12, 1945

2,377,851

UNITED STATES PATENT OFFICE 2,377,851

APPARATUS FOR CONTROLLING FLUID VOLUME IN FLUID COUPLINGS

Merton H. Blank, Pleasant Ridge, Mich., assignor to American Blower Corp., Detroit, Mich., a corporation of Delaware Application February 17, 1941, Serial No. 379,328

9 Claims. (Cl. 60—54)

This invention relates to a variable speed fluid coupling, and particularly to a method and apparatus for regulating the circulation of fluid to the coupling, and for reducing the increment of change of the speed differential between the runner and impeller of the fluid coupling for a given fluid volume increase or decrease in the coupling.

Difficulty has been encountered in accurately regulating the speed variation of small variable speed fluid couplings. This trouble is encountered due to the small volume contained within the active fluid circulating chamber between the runner and the impeller of the fluid drive mechanism. To vary the speed of the runner the total volume of fluid in the working chamber is increased or decreased whereby upon an increase of volume of fluid in the working chamber the slip between the impeller and runner will be reduced, while upon a decrease in volume of the working fluid the slip will be increased. When the fluid coupling is of a small size a small volume of oil added to or taken from the working chamber widely alters the speed change between the runner and the impeller. To produce sufficiently small increments of change of speed differential the controlling mechanism which regulates the flow of fluid to the working chamber must be extremely sensitive. When the increments of change of the controlling mechanism are relatively small the valve mechanisms operated thereby for controlling fluid flow to the working chamber are not sufficiently sensitive to increase or decrease the volume flow therethrough in sufficiently small increments that the fluid coupling will be regulated in relatively small increments of speed change.

It is an object of the invention to reduce the sensitivity of a fluid coupling to the change in volume of the fluid within the working chamber so that larger quantities of oil can be handled for a given speed change of the coupling.

It is another object of the invention to provide a relatively large chamber for receiving work fluid, which chamber is divided by means of the runner into two compartments in a manner that the body of fluid in both of the compartments are in continuous association as a single body of fluid, but wherein only a portion of the body is used as the active fluid for transmitting power from the impeller to the runner.

It is another object of the invention to provide a fluid drive in accordance with the foregoing object wherein the fluid volume change in the work chamber affects the body of fluid in both of the compartments, but that the volume change effected in the active circulating chamber is only a definite percentage of the entire fluid volume change whereby the sensitivity of the fluid coupling is reduced with respect to a given volume change of working fluid.

It is another object of the invention to provide a more sensitive control apparatus for regulating the flow of fluid to the working chamber of a fluid coupling.

It is another object of the invention to control the admission of work fluid to the work chamber of a fluid coupling by means of a fixed orifice.

It is another object of the invention to provide a fluid coupling in accordance with the foregoing object wherein the pressure applied to the fixed orifice is controlled so that the pressure drop across the orifice determines the quantity of fluid admitted to the work chamber.

It is another object of the invention to provide a control apparatus for regulating the pressure of the working fluid which is applied through a fixed orifice associated with the work chamber of the coupling.

It is another object of the invention to provide a fluid coupling wherein a relatively large change in volume of oil within the work chamber produces a relatively small change in the speed differential between the runner and the impeller.

It is another object of the invention to provide a fluid coupling wherein the quantity of oil circulated through the coupling can be increased without causing a wide change in speed differential between the impeller and the runner, the increased quantity of oil circulated providing for more efficient cooling of the coupling and the oil circulated.

It is another object of the invention to provide a variable speed fluid coupling wherein a relatively large quantity of fluid can be admitted to the work chamber without greatly affecting the vane surface exposed to the fluid circulating between the runner and the impeller so that the addition of a large quantity of oil to the work chamber produces a relatively small change in speed differential.

A further object of the invention is to provide a method of controlling the speed variation of a fluid coupling in a manner that a relatively large change in oil volume in the working chamber effects a small change in the output speed.

Another object is to provide a method of controlling the quantity of fluid conducted to a variable speed fluid coupling by resisting the flow thereto and applying a varying fluid pressure to the resistance to regulate the fluid flow therethrough.

Further objects and advantages will become apparent from the description and the drawings.

In the drawings:

Figure 3 is an elevational view of a portion of the runner of the fluid coupling and is taken along line 3—3 of Figure 2.

In this invention the fluid coupling is disclosed as applied for use upon an aircraft for driving the supercharger. The speed of change must be accurately controlled in order to provide complete regulation of the carburation of the aircraft engine. It can readily be appreciated that while the application of the fluid coupling to the supercharger of the aircraft is a particular application, yet the disclosure is such that it merely shows one applied form of the invention. It is within the conception of this invention to accurately control the speed of any driven apparatus which is connected to a power source through a fluid coupling. The need for an accurate control of the speed of a driven mechanism, when driven by a fluid coupling, is accentuated when the size of the coupling is reduced and even more so when the small sized couplings are operated at relatively high speeds. The application of the fluid coupling, as disclosed in this invention, merely shows one form of application wherein the problem is extremely acute, and which requires extreme accuracy over the output speed of the runner of the fluid coupling.

This invention consists of a housing 10 which is provided for enclosing the operating mechanism of the fluid coupling. As disclosed in this application, the housing 10 is an independent member. However, this housing could be provided as an integral part of the apparatus upon which the fluid coupling is to be mounted. The housing 10 provides means, wherein the fluid normally discharged through the leak ports of the fluid coupling is collected, and is connected by suitable means with an oil reservoir which is either a separate piece of mechanism or, in the case of aircraft, the oil reservoir can be the crank case of the engine.

The fluid coupling consists of an impeller 11 keyed upon a shaft 12 which is bearinged in the housing 10 by means of the bearing sleeves 13 and 14. The impeller 11 has an arcuately shaped inner face contour 15 and is provided with a plurality of radially disposed vanes 16, which structure is conventional for fluid couplings. The vanes 16 carry a core ring 17 which core ring is slotted between the vanes as indicated at 18.

A runner 19 is bearinged upon the shaft 12 by means of the sleeve bearings 20 and 21. This runner 19 is provided with an arcuately shaped inner face 22 and carries a plurality of vanes 23, which runner structure is conventional for fluid couplings. In this invention, however, the runner 19 is provided with a plurality of slots 24 and 25 in the body thereof which extend radially from the center of the runner and are positioned between the vanes 23. The slots 24 extend between every other vane of the runner 19 and are positioned with the inner ends thereof toward the inner side of the arcuate face 22 of the runner 19, while the slots 25 have their outer ends near the outer extremity of the arcuate face 22. A core ring 35 is carried by the vanes 23 and is provided with a plurality of slots 36. The slots 36 are located between each of the vanes 23 to provide an interrupted core in the same manner that the slots 18 interrupt the core 17.

The runner 19 is provided with an extending shaft 26 which surrounds the shaft 12 and which is bearinged upon the bearings 20 and 21. The end of the shaft 26 engages an upwardly turned flange 27 upon the bearing 21, which flange engages a ring 28 which is in threaded engagement with the shaft 12. The flange 27 thus provides a thrust bearing for the shaft 26 to absorb the normal separating thrust of the runner and of the impeller.

The impeller 11 is keyed to the shaft 12 by means of the key member 29 and has a boss 30 which engages a gear 31 also keyed to the shaft 12 by means of a key 32. A thrust ring 33 is in threaded engagement with the shaft 12 and bears against the up-turned flange 34 of the bearing 13 to absorb the thrust of the endwise thrust of the impeller 11.

A cylindrical chamber 37 is provided with an open end which is in engagement with an annular flanged recess 38 provided on the impeller 11. Bolts 39 extend through the annular flange 40 of the recess 38 into threaded engagement with the cylindrical chamber 37 for securing the chamber to the impeller 11. The chamber 37 extends rearwardly of the impeller 11 and has an inwardly directed wall 41 which carries a boss 42. The boss 42 is bearinged upon the shaft sleeve 26 by means of the bearing bushing 43. The cylindrical chamber 37 thus encloses the runner 19, and the arcuately curved wall 22 of the runner 19 divides the chamber formed by the impeller 11 and the cylindrical chamber 37 into two compartments.

In the compartment provided between the impeller 11 and the runner 19 the fluid retained therein is adapted to actively circulate between the impeller 11 and the runner 19 upon rotation of the impeller, whereby the runner 19 is driven by the active circulation of the fluid in the compartment. The outer compartment 44 provided between the runner 19 and the wall of the cylindrical chamber 37 provides means for receiving a body of fluid. The heretofore described slots 24 and 25 provide open communication between the compartment 44 and the compartment 45, located between the impeller 11 and the runner 19, whereby the body of fluid in the compartments 44 and 45 functions as a single body of fluid. That is, when the impeller 11 is rotated the body of fluid in the compartments 44 and 45 is carried adjacent the outer wall of the cylindrical chamber 37 so that the radial distance of the surface of the fluid from the center of the chamber 37 is the same in both of the compartments 44 and 45. This relation of the body is of course maintained continuously through the intercommunication of the slots 24 and 25. It can readily be seen that if the body of fluid within the working chamber, comprising the compartments 44 and 45, is either added to or subtracted from that the entire surface of the fluid will advance or recede from the center of rotation of the cylindrical chamber 37. The purpose of such variance of the entire surface of the fluid will be hereinafter more fully described.

The shaft 12 which carries the impeller 11 and the runner 19 is bearinged in the sleeve bearings 13 and 14 which in turn are retained within the bosses 46 and 47 respectively which are an integral part of the housing 10. The sleeve bearing 14 has a flange 48 which engages the boss 47 for longitudinal location of the ring 28, while the sleeve bearing 13 has a flange 34 in engagement with the boss 46 for longitudinal positioning of the ring 33, whereby the shaft 12 is longitudinally positioned. The sleeve bearing 14 has a closed end wall 49 thereby forming a cap for closing and enclosing of the end of the shaft 12. The opposite end of the shaft 12 is enclosed by a wall closure member 50 which has an extending annular portion 51 which surrounds and encloses the end of the shaft 12.

The interior of the shaft 12 has a longitudinally extending bore 52 which communicates with a passageway 53 provided in the end closure plate 50. The passageway 53 communicates with the pressure side of an oil pump so that the interior of the shaft 52 is under pressure, and is filled with oil when the fluid coupling is functioning. An oil seal 54 is provided in the annular extending portion 51 of the closure plate 50 for preventing leakage of oil into the housing 10 from the pressure source from within the shaft 52.

The gear 31, secured upon the shaft 12, engages a gear 55 which is keyed upon a shaft 56, which shaft 56 extends parallel to the shaft 12. The shaft 56 has an enlarged portion 57 which is supported within the bearing 58 carried within the boss 74 which is provided in the wall 10a of the housing 10. The shaft 56 extends through the side wall of the housing 10 and is provided with a fastening plate 59 on the end thereof which is keyed to the shaft 56 by a key member 60. The fastening plate 59 is connected to a suitable source of power and, as disclosed in this invention, the source of power is the engine of the aircraft. It is well understood however that this is not the only source of power which can be utilized for driving the impeller of the fluid coupling and it is dependent upon the use to which the coupling is put as to the particular source of power which will be connected to the fastening plate 59.

The gear 55 is secured upon the shaft 56 by means of the collar 61 which is in threaded engagement with the shaft 56 and retaining the gear between the collar 61 and the enlarged portion 57. The fastening plate 59 is secured to the shaft 56 by means of the collar 62 which is in threaded engagement with the end 63 of the shaft 56. An oil seal 64 is provided around the shaft 56 to prevent oil from leaking from the housing 10.

The output from the fluid coupling is transmitted through a gear 65 keyed upon the sleeve shaft 26 by means of the key 66. The gear 65 is retained in position upon the shaft sleeve 26 by means of the collar 67 which is in threaded engagement with the sleeve shaft 26. The gear 65 is in meshing relationship with a gear 68 keyed to a sleeve shaft 69 by means of a key 70. The sleeve shaft 69 surrounds the shaft 56 and is bearinged thereupon by means of the sleeve bearings 71. The sleeve shaft 69 is in turn bearinged within the bearing bushing 72 which is carried by the boss 73 provided in the wall 10b of the housing 10. The sleeve shaft 69 extends through the wall 10b, upon which extending portion there is mounted a power take-off plate 75. The power take-off plate 75 is keyed to the end portion 76 of the sleeve shaft 69 by means of the key 77 and is retained thereon by means of the collar 78 which is in threaded engagement with the end portion of the shaft 69. An oil seal 79 is provided around the end portion 76 of the sleeve shaft 69.

The step-up gear ratio between the gears 55 and 31 drives the fluid coupling at a higher speed than is obtained by the power source so that the horsepower output of the hydraulic fluid coupling will be increased for a given size of coupling, the horsepower of the coupling going up as the cube of the speed. The gear ratio between the runner and the power take-off shaft may be any desired gear ratio according to the speed required of the driven apparatus. This gear ratio can either increase the speed taken from the runner of the fluid coupling, or the speed can be reduced in accordance with the desired requirements.

The bearing sleeves 13, 14, 58 and 72 are connected to a source of fluid pressure which lubricates the bearings. Each of the bearings 13, 14, 58 and 72 is provided with a coupling connection 80 (not shown on bearings 58 and 72) which is connected by means of the conduits 81 to a suitable source of oil pressure, such as the oil pump on the aircraft engine. A plurality of oil holes 82 is provided in the wall of the shaft 12 to lubricate the bearings 20 and 21, and also to aid in lubrication of the bearings 13 and 14 through the oil holes 83. The bearing 43 is provided with lubrication through the oil hole 84 extending through the shaft 12 and the oil hole 85 extending through the sleeve shaft 26 whereby oil is conducted to the friction surface of the bearing 43.

In order to vary the speed differential between the impeller 11 and the runner 19 the volume of the oil within the chamber 45 is varied. To control the volume of oil within the chamber 45 fluid inlet ports 86 connect the interior of the shaft 12 with the working chamber 45 of the fluid coupling to permit oil to flow from the hollow interior of the shaft 12 into the working chamber. One or more leak ports 87 is provided around the periphery of the cylindrical chamber 37. The leak ports 87 are calibrated fixed orifices which continuously bleed a portion of the oil from the working chamber of the fluid coupling. The oil is continuously supplied to the working chamber of the fluid coupling by means of the ports 86 and it is the differential of volume flow through the ports 86 and 87 which determines the change in the total volume of liquid within the working chamber of the fluid coupling. Means are provided for controlling the volume of oil passing through the ports 86 for regulating the speed output of the runner 19. While the applicant discloses a specific means for accomplishing this function which will be hereinafter described, yet for the purpose of understanding the function of the double chamber effect of the impeller it need only be understood at this point that the volume of fluid to the working chamber 45 of the impeller 11 is controlled to vary the flow differential through the orifices 86 and 87.

The conventional type fluid coupling consists merely of the impeller 11 and the runner 19, the runner 19 operating within a housing which fits very closely to the outside contour of the runner whereby the only fluid within the casing is that fluid between the impeller and the runner, and which entire body of fluid is active for power transmission between the impeller and the runner. In this invention, however, the applicant has provided an enlarged work chamber in which the body of fluid is divided into an active work fluid for transmitting power between the impeller and the runner, and an inactive body which is retained within that portion of the chamber which is outside the confines of the impeller and runner chamber. The radial slots 24 and 25 in the body of the runner provide constant communication between the work fluid within the compartment 45 provided between the impeller 11 and the runner 19 and the work fluid in the compartment 44 so that when fluid is admitted to or taken from the interior of the cylindrical casing 37 the entire volume of fluid is affected, but only that percentage of the total volume removed from or added to the chamber 45 is effective for causing variation in the speed ratio between the impeller and the runner since it is only the body of fluid in the chamber 45 which is actively transmitting power.

Figure 1:
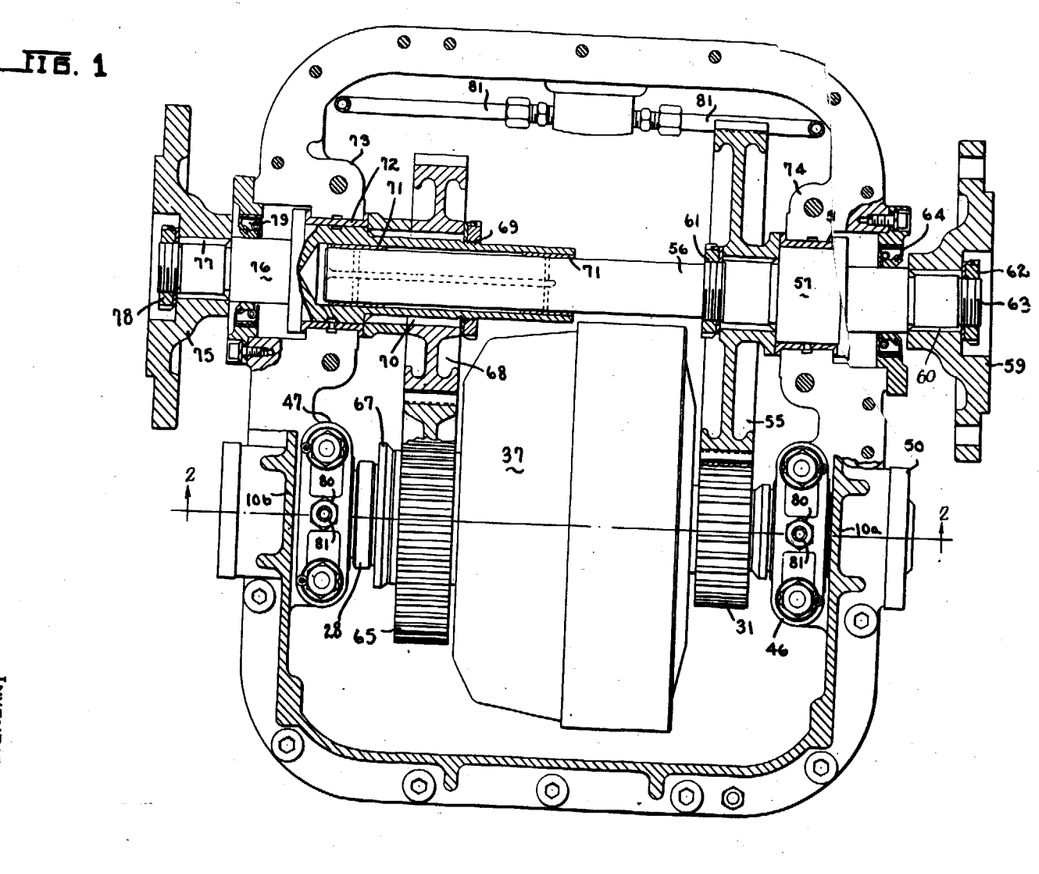
Figure 1 is a plan view, partially in cross-section, of a fluid coupling drive mechanism showing the power input and take-off from the coupling.
Figure 2:
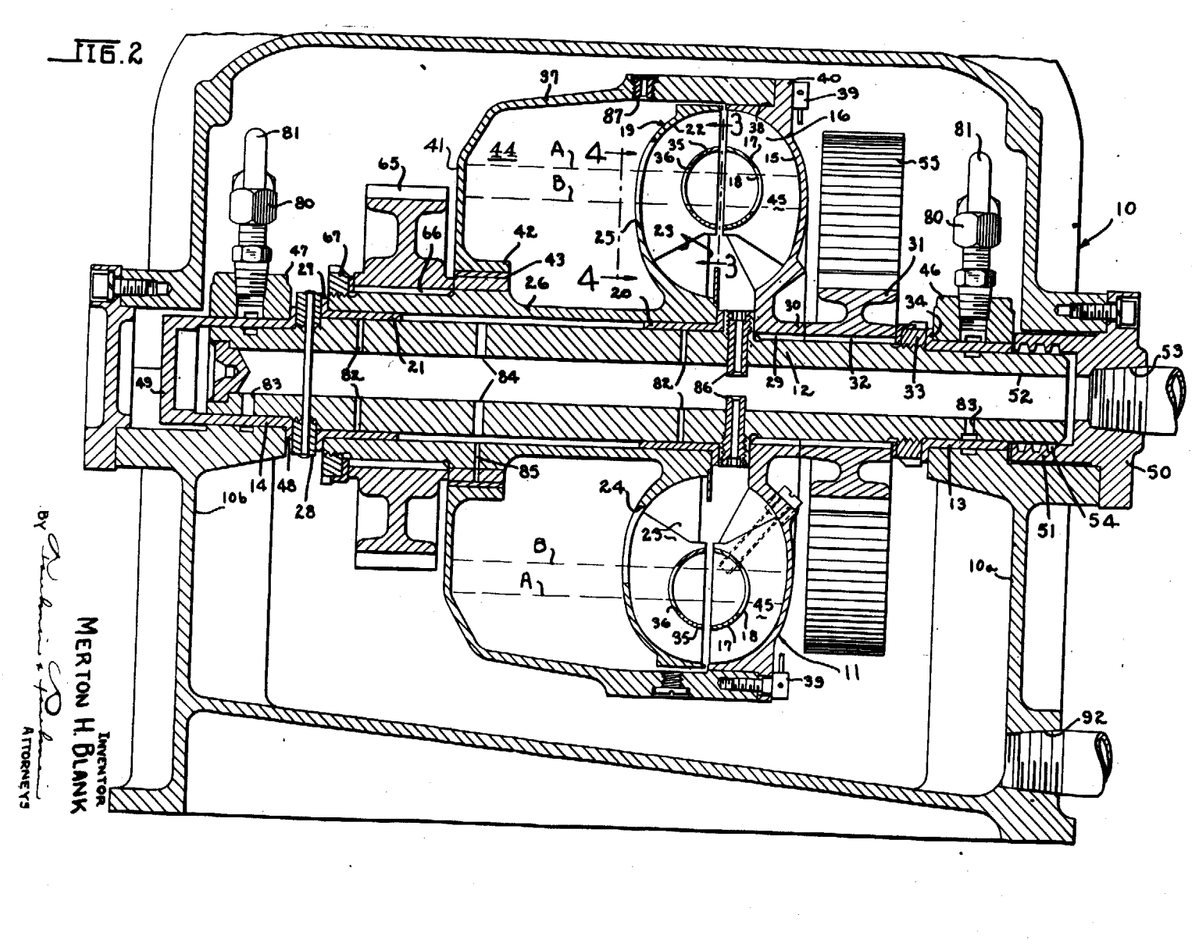
Figure 2 is a vertical cross-sectional view taken along line 2—2 of Figure 1.
Figure 4:
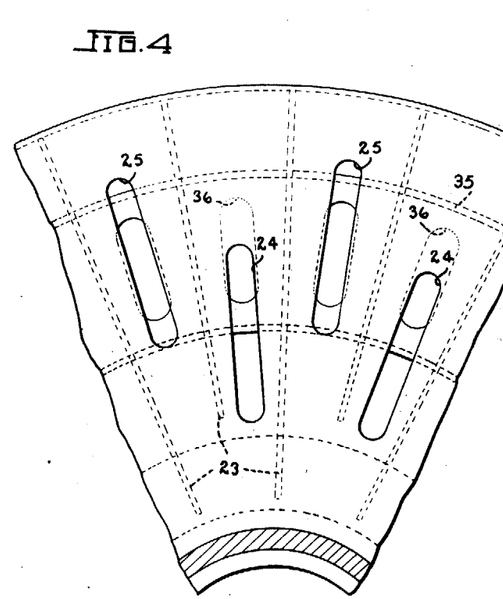
Figure 4 is an elevational view of a portion of the runner of the fluid coupling and is taken along the line 4—4 of Figure 2.

When the fluid coupling is rotated by the power source the liquid within the coupling will collect in a ring around the periphery of the chamber and, for purposes of description, the ring can be indicated by the dotted line "A." When the liquid within the cylindrical chamber 37 fills the volume indicated by the line A, which volume is between the line A and the outer wall of the cylindrical chamber 37, a definite speed ratio will be obtained between the impeller 11 and the runner 19. In order to increase the speed of the runner 19 with respect the impeller 11 a greater quantity of oil is required to be added to the working chamber 45. The control means for regulating the quantity of oil flowing through the ports 86 is operated to increase the flow through the ports 86 whereby the oil volume may be increased to the volume indicated by the line B. It can be readily seen from the oil volumes indicated by the lines A and B in Figure 2 that the total volume of oil handled is considerably greater than that which would normally be required to raise the volume of oil within the chamber 45 alone from the volume A to the volume B, whereby the extreme sensitivity of the fluid coupling to changes in volume is reduced so that like volumes of oil as previously handled will, when handled in the applicant's apparatus, produce less speed change between the runner 19 and the impeller 11 since the total volume of oil effective for power transmission within the compartment 45 will be less. It is thus seen that the applicant has reduced the sensitivity of the fluid coupling with regard to changes in the volume of oil passing through the coupling, and has at the same time increased the sensitivity in the sense that the increment of speed change of the runner with respect the impeller is considerably reduced over that which would normally occur upon handling the same quantity of oil in the conventional types of apparatus.

The apparatus, as heretofore described, is adaptable for use upon aircraft for driving the supercharger, which must be regulated at relatively small increments of speed increase for small increments of altitude rise of the aircraft, and the device must be fully and completely responsive to any sudden rise of the aircraft.

The engine 90 of the aircraft is connected to the gear 55 of the hydraulic coupling heretofore described so that the gear 31 in turn is driven from the engine 90 and thereby drives the impeller 11. The runner 19 drives the supercharger 91 through means of the gears 65 and 68 heretofore referred to. The housing 10 is provided with a drain opening 92 to permit a gravity return of oil from the housing 10 to the crank case of the engine 90 through a conduit 93. This oil return can either be by gravity or by a pressure return as desired.

As heretofore mentioned the applicant provides a positive pressure within the interior of the shaft 12 to feed fluid through the ports or orifices 86, and controls this pressure to regulate the quantity of oil passed through the orifices 86. This control mechanism consists of a fluid pump 94 connected by a conduit 95 to a suitable source of oil or other fluid, such as the crank case of the engine. A conduit 96 connects the fluid pump with the inlet opening 53 of the shaft 12 to conduct fluid under pressure from the pump 94 to the interior of the shaft 12.

A by-pass pressure relief valve 97 is provided in a conduit 98 connecting the discharge side of the pump 94 and the housing 10. This pressure relief valve 97 is provided with an adjustable control spring 99 for regulating the pressure at which the valve will open to permit oil or liquid to be circulated through the conduit 98 for return to the housing 10 or to the crank case of the engine.

A control valve 100 is provided in a conduit 101 which interconnects the discharge side of the pump 94 with the housing 10. This conduit 101 parallels the conduit 98 so that the pressure relief valve 97 and the control valve 100 are arranged in parallel flow relation. The control valve 100 may be regulated by any suitable mechanism which is responsive to an apparatus to be controlled. As applied to aircraft, the valve 100 will be operated in response to a barometric pressure control 102 upon a rise and fall of the aircraft. The applicant is not limited to the specific type of control disclosed in this application since this control is merely representative of a system in which applicant's invention is useful.

The pressure relief valve 97 is set to open at a predetermined maximum pressure, according to the compression of the spring 99, which spring is adjustable. This pressure relief valve thus prevents overloading the system regardless of the volume of oil delivered by the pump 94 and in effect becomes a constant pressure valve for the conduit 96 when the valve 100 is completely closed. This condition exists only when the aircraft is at extreme altitude.

The valve 100 is a variable orifice or choke valve for throttling the flow of oil by-passed therethrough to the housing 10 or to the crank case of the engine. Under normal operating conditions the valve 100 determines the pressure existing in the conduits 101 and 96, which valve in turn is operated in response to the barometric control 102 so that the pressure in the conduit 96 is affected, or increased as the barometric control tends to close the valve 100.

Under normal operation, when the aircraft is on the ground or at low altitude, the valve 100 will be completely open at which time the pressure in the conduit 96 is maintained at a minimum pressure by means of a pressure relief valve 103, the minimum pressure relief valve being provided to maintain sufficient pressure within the shaft 12 to insure lubrication of the bearings within the fluid coupling. At this time the pressure relief valve 97 is closed, and the valve 100 is capable of passing the full volume of oil discharged from the pump 94 regardless of the speed of the engine as long as the valve 100 is in "wide open position." At low altitude the use of the supercharger is not required so that at this time the runner 19 will not be functioning except for the speed developed by the maximum slip allowed in the fluid coupling.

When the pressure control valve 100 tends to throttle the flow of fluid discharged from the pump 94 through the by-pass conduit 101, pressure builds up in the line 96. Throttling of the valve 100 can either by accomplished by the barometric control 102 or by other satisfactory control devices.

When the pressure increases in the conduit 96 the volume of oil passed by the fixed restrictions 86 is increased, the volume of oil passed by the restrictions 86 being as of the square root of the pressure difference across the restriction. Since the increased flow through the restrictions 86 is relatively small for a relatively large increase in pressure in the conduit 96 it can readily be appreciated that the volume of fluid or oil added to the working chamber of the fluid coupling is readily controllable and is controllable to the extent of handling more minute quantities of oil for a given change of the control mechanism. The pressure difference across the orifices 86 is always a predetermined and constant factor and the flow therethrough increases at a predetermined rate in accordance with the increase of pressure on the inlet side of the orifice. This rate of increase of flow through the orifices 86 can be calibrated as against the discharge of fluid from the cylindrical chamber 37 through the leak ports 87, so that when the control valve 100 is closed and the maximum pressure, as allowed by the valve 97, is developed in the conduit 96 the fluid coupling will be completely full of oil and thus will be rotating the runner with minimum slip.

Since the applicant has provided a fluid flow control which regulates the quantity of fluid admitted into the working chamber of the fluid coupling in minute quantities and has provided a working chamber wherein the minute quantities of oil added to the chamber affect a body of oil greater than is used for direct power transmission between the impeller 11 and the runner 19, it can be appreciated that the sensitivity of the fluid coupling to changes in speed caused by changing the volume of oil in the coupling is reduced. It will also be appreciated that a larger quantity of oil must be added to the coupling of this invention than to a conventional coupling to obtain a desired increase in volume of oil in the working chamber of the coupling to obtain a desired speed change between the runner and the impeller. The greater quantity of oil flowing through the fluid coupling permits more rapid cooling of the coupling, and prevents overheating of the oil therein when the coupling is running at speeds requiring relatively high slip between the impeller and the runner.

Figure 5:
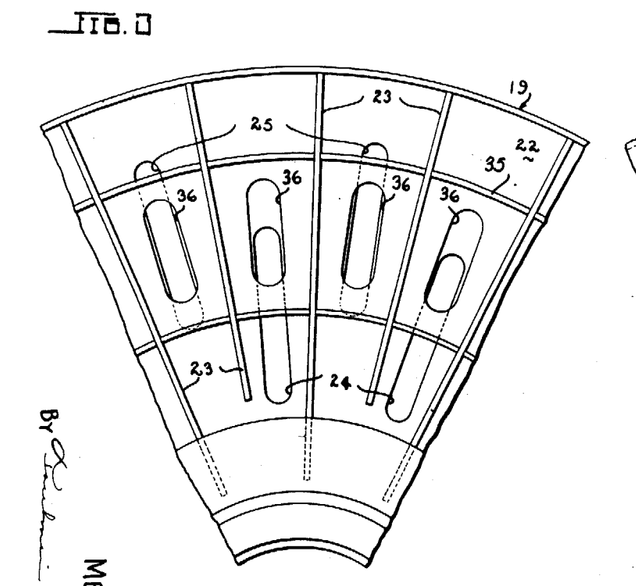
Figure 5 is a diagrammatic system view of the fluid coupling as applied to an aircraft engine for driving the supercharger, showing a pressure control system for regulating fluid flow to the coupling.
Figure 6:
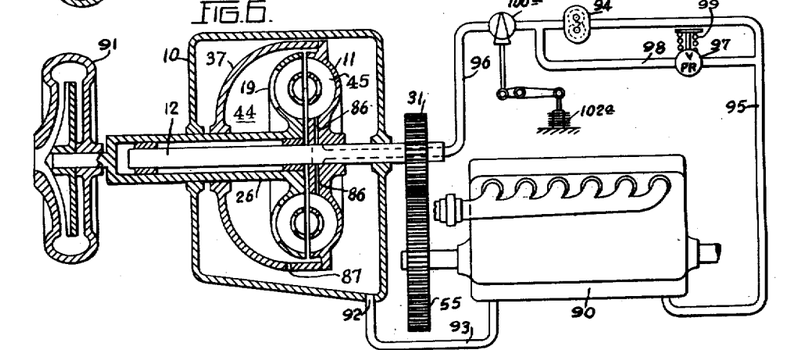
Figure 6 is a view similar to Figure 5 but shows the volume control for regulating the fluid flow to the coupling.

Figure 3 discloses a slightly modified form of control for regulating the quantity of oil conducted to the work chamber of the fluid coupling. In this modification the elements of the apparatus are identical with the elements disclosed in Figure 5 and like elements bear like numerals. In this modification, however, the control valve 100a is placed in the conduit 96, the barometric control 102a controlling the valve 100a in the same manner as described with regard the valve 100. When the valve 100a is placed in position, as disclosed in Figure 6, the control then functions as a volume control rather than as a pressure control as heretofore described with regard Figure 5. The valve 100a throttles the quantity of oil passing through the conduit 96, all excess oil being by-passed to the conduit 95 through the pressure relief valve 97. When using the valve 100a in the conduit 96 to directly control the volume of fluid passing through the conduit 96, the ports 86 should not be restrictions, or calibrated orifices, but are merely port passages through which the controlled volume of fluid passes to the work chamber 45 of the fluid coupling. The effect of the varied fluid volumes admitted to the work chamber 45 are identically the same as previously described.

Figure 7:
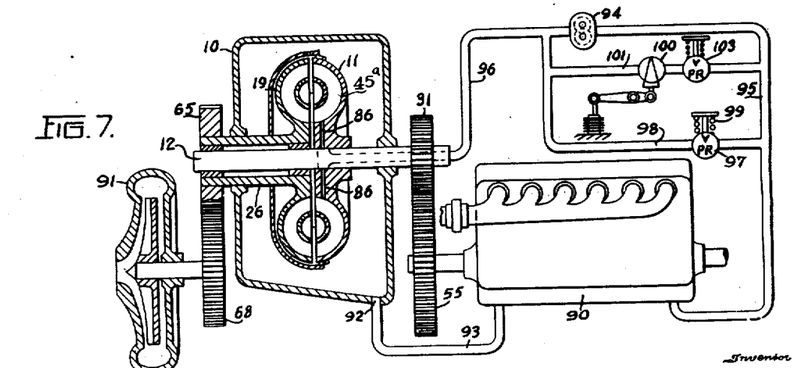
Figure 7 is a view similar to Figure 5 but shows the pressure control of fluid circulating to the fluid coupling for regulating the fluid flow to a conventional type of coupling.

In Figure 7 there is disclosed a further modification wherein the pressure control of the flow of fluid to the work chamber of a hydraulic coupling is used in combination with a conventional fluid coupling. In this arrangement the cylindrical chamber 37 is dispensed with and the entire working chamber consists of the chamber 45a. The passageways 86 in this instance are calibrated orifices and the degree of regulation obtained by means of these orifices over the volume of fluid admitted to the work chamber 44 is regulated in the same manner as disclosed with regard Figure 5.

While the forms of the apparatus disclosed in this application constitute preferred forms, yet it is within the scope of this invention that various constructional details can be modified without departing from the spirit of invention, and it is to be understood that while the invention has been applied with specific reference to an aircraft yet the invention is not so limited since it is readily applicable to any device which is to be driven through a fluid coupling and which requires relatively close regulation of the speed of the driven device.

Having thus fully described my invention, what I claim as new and desire to secure by Letters Patent is:

1. A variable filling fluid coupling comprising an impeller adapted to be rotated, a runner in operative association with said impeller to be driven thereby and forming therewith an active fluid circulation chamber for power transmission, a fluid chamber associated with said runner and having a volume at least equal to the volume of the active fluid chamber between said runner and said impeller, a plurality of openings in said runner for providing continuous intercommunication between said fluid chamber and said chamber between said runner and said impeller for interflow of fluid therebetween whenever the quantity of fluid within the coupling is altered, means for continuously discharging a small portion of the fluid from said chamber, and means for continuously adding fluid to said coupling, the total change in volume of fluid in said coupling effecting a speed change between said impeller and said runner which depends upon the change in volume of fluid in the active chamber.

2. A variable filling fluid coupling comprising an impeller and a cooperating runner forming a power transmission chamber for active circulation of fluid therein, a housing connected to said impeller and enclosing said runner having a space not occupied by the runner at least equal to the volume of the power transmission chamber to form an inactive work fluid chamber, a plurality of openings in said runner providing continuous intercommunication between said active fluid chamber and said inactive fluid chamber for interflow of fluid therebetween through the wall of said runner whenever the quantity of fluid within the coupling is altered, means for continuously discharging a small portion of the fluid from said coupling, means for continuously adding fluid to said coupling, and automatically operated fluid pressure control means associated with said last mentioned means to change the pressure of the fluid applied to said last mentioned means to thereby regulate the fluid flow therethrough.

3. A variable filling fluid coupling comprising an impeller and a cooperating runner forming a power transmission chamber for active circulation of fluid therein, a housing connected to said impeller enclosing said runner having a space not occupied by the runner at least equal to the volume of the power transmission chamber to form an inactive work fluid chamber, a plurality of openings in said runner providing continuous intercommunication between said active fluid chamber and said inactive fluid chamber for interflow of fluid therebetween through the wall of said runner whenever the quantity of fluid within the coupling is altered, fixed orifice means for continuously discharging a small portion of the fluid from said coupling, fixed orifice means through which fluid is added to said coupling, and fluid pressure control means associated with said last mentioned means to regulate the pressure of the fluid applied at the inlet of said last mentioned orifice means to change the fluid flow therethrough and effect a change in volume of the fluid in said coupling to produce a speed change between said impeller and said runner which depends upon the change in volume of fluid in the active compartment.

4. A variable filling fluid coupling comprising an impeller and a cooperating runner forming a power transmission chamber for active circulation of fluid therein, a housing connected to said impeller enclosing said runner having a space not occupied by the runner at least equal to the volume of the power transmission chamber to form an inactive work fluid chamber, a plurality of openings in said runner providing continuous intercommunication between said active fluid chamber and said inactive fluid chamber for interflow of fluid therebetween through the wall of said runner whenever the quantity of fluid within the coupling is altered. pressure differential fluid flow control means for varying the volume of work fluid supplied to said coupling, pressure differential fluid flow control means for regulating the discharge of fluid from said coupling, and means for changing the pressure of the fluid applied upon the inlet of the first mentioned control means to change the volume flow of the fluid therethrough to effect a speed change in said coupling.

5. A variable filling fluid coupling comprising an impeller adapted to be rotated, a runner in operative association with said impeller to be driven thereby, a fluid chamber associated with said runner and having a volume at least equal to the volume of the active fluid chamber between said runner and said impeller, passage means for providing continuous intercommunication between said fluid chamber and said chamber between said runner and said impeller for interflow of fluid therebetween whenever the quantity of fluid within the coupling is altered, fixed orifice means for regulating the quantity of fluid discharged from said fluid coupling, a second fixed orifice means for regulating the quantity of fluid admitted to said fluid coupling for varying the volume of fluid therein, the variation in the speed differential between the runner and impeller depending upon the change in the fluid volume placed in active circulation, and means for regulating the pressure of the work fluid applied to said second mentioned orifice for regulating the flow therethrough in accordance with the pressure drop across said orifice.

6. A variable filling fluid coupling comprising an impeller adapted to be rotated, a runner in operative association with said impeller to be driven thereby, a fluid chamber associated with said runner and having a volume at least equal to the volume of the active fluid chamber between said runner and said impeller, a plurality of openings in said runner for providing continuous intercommunication between said fluid chamber and said chamber between said runner and said impeller for interflow of fluid therebetween whenever the quantity of fluid within the coupling is altered, fixed orifice means for regulating the quantity of fluid discharged from said fluid chamber, a second fixed orifice means for regulating the quantity of fluid admitted to said fluid coupling for varying the volume of fluid therein, whereby the variation in the speed differential between the runner and impeller depends upon the change in the fluid volume placed in active circulation, means for regulating the pressure of the work fluid applied to said second mentioned orifice for regulating the flow therethrough in accordance with the pressure drop across said orifice, said last mentioned means comprising a fluid pump for producing said pressure, and means for regulating said pressure between predetermined maximum and minimum pressures.

7. A variable filling fluid coupling comprising an impeller adapted to be rotated, a runner in operative association with said impeller to be driven thereby, a fluid chamber associated with said runner and having a volume at least equal to the volume of the active fluid chamber between said runner and said impeller, a plurality of openings in said runner for providing continuous intercommunication between said fluid chamber and said chamber between said runner and said impeller for interflow of fluid therebetween whenever the quantity of fluid within the coupling is altered, fixed orifice means for regulating the quantity of fluid discharged from said fluid chamber, a second fixed orifice means for regulating the quantity of fluid admitted to said fluid coupling for varying the volume of fluid therein, whereby the variation in the speed differential between the runner and impeller depends upon the change in the fluid volume in active circulation, means for regulating the pressure of the work fluid applied to said second mentioned orifice for regulating the flow therethrough in accordance with the pressure drop across said orifice, said last mentioned means comprising means for delivering fluid to said second mentioned orifice and for placing the fluid so delivered under pressure, means for changing the value of pressure of the fluid so delivered to said second mentioned orifice to thereby change the pressure drop across the orifice and thus change the volume flow therethrough for controlling speed changes of said coupling, and means for by-passing said last mentioned control means for preventing pressure increase above a predetermined maximum irrespective of speed control.

8. A variable filling fluid coupling comprising an impeller adapted to be rotated, a runner in operative association with said impeller to be driven thereby, a fluid chamber associated with said runner and having a volume at least equal to the volume of the active fluid chamber between said runner and said impeller, a plurality of openings in said runner for providing continuous intercommunication between said fluid chamber and said chamber between said runner and said impeller for interflow of fluid therebetween whenever the quantity of fluid within the coupling is altered, fixed orifice means for regulating the quantity of fluid discharged from said fluid chamber, a second fixed orifice means for regulating the quantity of fluid admitted to said fluid coupling for varying the volume of fluid therein, whereby the variation in the speed differential between the runner and impeller depends upon the change in the fluid volume in active circulation, means for regulating the pressure of the work fluid applied to said second mentioned orifice for regulating the flow therethrough in accordance with the pressure drop across said orifice, said last mentioned means comprising means for delivering fluid to said second mentioned orifice and for placing the fluid so delivered under pressure, means for changing the value of pressure of the fluid so delivered to said second mentioned orifice to thereby change the pressure drop across the orifice and thus change the volume flow therethrough for controlling speed changes of said coupling, means for by-passing said last mentioned means for preventing pressure increase above a predetermined maximum irrespective of speed control, and means in series circuit flow relation with said aforesaid last mentioned means for preventing said pressure from falling below a predetermined minimum to establish a minimum fluid flow therethrough for lubrication purposes.

9. A variable filling fluid coupling comprising an impeller adapted to be rotated, a runner in operative association with said impeller to be driven thereby and forming therewith an active fluid circulation chamber for power transmission, a housing connected to said impeller enclosing said runner having a space not occupied by the runner at least equal to the volume of the active fluid chamber between said runner and said impeller, a plurality of openings in said runner for providing continuous intercommunication between said space and said chamber between said runner and said impeller for interflow of fluid therebetween whenever the quantity of fluid within the coupling is altered, means for continuously discharging a small portion of the fluid from said chamber, and means for continuously adding fluid to said chamber, the total change in volume of fluid in said coupling effecting a speed change between said impeller and said runner which depends upon the change in volume of fluid in the active chamber.

MERTON H. BLANK.